(12) United States Patent
Oveyssi et al.

(10) Patent No.: US 6,947,251 B1
(45) Date of Patent: Sep. 20, 2005

(54) DISK DRIVE HAVING ELECTRICALLY PARALLEL ACTUATOR COILS FOR SELECTIVELY BOOSTING ACTUATOR TORQUE

(75) Inventors: Kamran Oveyssi, San Jose, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 112 days.

(21) Appl. No.: 10/724,345

(22) Filed: Nov. 26, 2003

(51) Int. Cl.$^7$ .............................................. G11B 5/55
(52) U.S. Cl. ................................. 360/78.12; 360/265
(58) Field of Search ............................. 360/78.12, 75, 360/78.04–78.06, 265

(56) References Cited

U.S. PATENT DOCUMENTS 5,991,124 A * 11/1999 Forbord ...................... 360/265
6,104,581 A    8/2000 Huang et al.

* cited by examiner

*Primary Examiner*—David Hudspeth
*Assistant Examiner*—Varsha A. Kapadia
(74) *Attorney, Agent, or Firm*—Milad G. Shara, Esq.; Alan W. Young, Esq.

(57) ABSTRACT

A disk drive includes a disk, a voltage supply, a head stack assembly and a switching circuit. The head stack may include a coil portion that includes a coil assembly having first and second wound coils. The switching circuit is electrically coupled to the voltage supply and to the coil assembly, and is configured to selectively switch the first and second wound coils between a first configuration and a second different configuration in which the first wound coil is electrically in parallel with the second wound coil.

26 Claims, 5 Drawing Sheets

DISK DRIVE HAVING ELECTRICALLY PARALLEL ACTUATOR COILS FOR SELECTIVELY BOOSTING ACTUATOR TORQUE

BACKGROUND OF THE INVENTION

1. Field of the Invention

The present invention relates to disk drives. More particularly, the present invention relates to disk drives having a voice coil motor that is configured to selectively assume a first configuration that can generate a first maximum torque and assume a second configuration that can generate a second, higher maximum torque.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. A Voice Coil Motor (VCM) exerts torque on a rotary actuator to move the HSA over the disk. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider or head including the drive's read/write transducers is said to be "flying" over the disk when in this state.

Competitive pressures continue to drive the disk drive industry to seek ways to market ever higher performing drives. One of the more competitively important drive metrics is the track access time. The track access time is the time the read/write heads of the actuator assembly take to travel from their present track to a destination track on the disk surface. To reduce the actuator track access time (i.e., to make the actuator assembly move faster) using a conventional VCM requires increasing the magnet volume, increasing the number of coil wire turns and/or increasing current input to the coil to generate increased torque. Each of these alternatives has drawbacks. Increasing the magnet volume requires a corresponding increase in the volume of the magnet back irons, and the extra space needed for such increases may not be available in the drive enclosure. Increasing the number of coil turns may unacceptably increase the actuator inertia and may detrimentally reduce the butterfly mode frequency of the actuator. Lastly, the current to the coil may not be arbitrarily increased, as the maximum current that may be input to the coil depends on the available voltage as well as the total resistance of the coil. As the VCM is driven with ever-higher currents in an effort to reduce seek times, thermal dissipation in the VCM also becomes an important issue. Indeed, heat is generated as the coil of the VCM is subjected to high coil driving currents and this heat must somehow be dissipated without damage to the drive.

From the foregoing, therefore, it is clear that improved disk drives are and will continue to be needed. In particular, higher performing drives are needed to drive the VCM's coil with higher input current to achieve faster seek times. Also needed are disk drives in which such fast seek times are achieved without overheating the VCM's coil.

SUMMARY OF THE INVENTION

According to an embodiment thereof, the present invention is a disk drive, comprising a disk; a single supply of voltage and a head stack assembly for reading and writing to the disk. The head stack may include a body portion; an actuator arm cantilevered from the body portion; a coil portion cantilevered from the body portion in an opposite direction from the actuator arm, the coil portion including a coil assembly having a first wound coil and a second wound coil, the first coil defining a first pair of coil leads and the second wound coil defining a second pair of coil leads, and a switching circuit electrically coupled to the single supply of voltage and to the first and second pairs of coil leads, the switching circuit being configured to selectively switch the first and second wound coils between a first configuration and a second configuration in which the first wound coil is electrically in parallel with the second wound coil, the second configuration being different from the first configuration.

In the first configuration, the first wound coil may be electrically in series with the second wound coil. Alternatively, in the first configuration, the first wound coil may be electrically disconnected from the second wound coil. The first wound coil and the second wound coil may both be formed of wire having the same or substantially the same gauge. The first wound coil and the second wound coil may each be formed of wire having a different gauge. The first wound coil and the second wound coil may both be formed of a same number of coil turns. The first wound coil and the second wound coil may each be formed of a different number of coil turns. The first wound coil and the second wound coil may have the same or substantially the same resistance. The first wound coil and the second wound coil may each have a different resistance. The coil assembly may be configured to be supplied with a constant voltage and with a first current of a first magnitude when the switching circuit switches the first and second wound coils into the first configuration and a second current of a second magnitude when the switching circuit switches the first and second wound coils into the second configuration, the second magnitude being greater than the first magnitude. The switching circuit may be configured to switch the first and second wound coils into the second configuration only during selected seek operations. The switching circuit may be configured to switch the first and second wound coils into the second configuration for a time period that is controlled such that a temperature of the coil assembly does not exceed a predetermined threshold. The first and second wound coils may be adhesively attached to one another. The first pair of coil leads may include a first coil lead and a second coil lead, the second pair of coil leads may include a third coil lead and a fourth coil lead. The disk drive may further comprise a first flex circuit including a first flex circuit lead, a second flex circuit lead, a third flex circuit lead and a fourth flex circuit lead, and the switching circuit may selectively connect the first coil lead to the first flex circuit lead, may selectively connect the second coil lead to the second flex circuit lead, may selectively connect the third coil lead to the third flex circuit lead and may selectively connect the fourth coil lead to the fourth flex circuit lead. The switching circuit may be configured to cause the coil assembly to exert a first maximum torque on the head stack assembly when the first and second wound coils are switched to the first configuration and the switching circuit may be configured to cause the coil assembly to exert a second maximum torque on the head stack assembly when the coil assembly is in the second configuration, the second maximum torque being greater than the first maximum torque.

The present invention is also a head stack assembly for a disk drive, comprising a body portion; an actuator arm cantilevered from the body portion; a coil portion cantilevered from the body portion in an opposite direction from the actuator arm, the coil portion including a coil assembly having a first wound coil and a second wound coil, the first coil defining a first pair of coil leads and the second wound coil defining a second pair of coil leads, and a switching circuit that is configured to be electrically coupled to a single supply of voltage and to the first and second pairs of coil leads. The switching circuit may be configured to selectively switch the first and second wound coils between a first configuration and a second configuration in which the first wound coil is electrically in parallel with the second wound coil, the second configuration being different from the first configuration.

In the first configuration, the first wound coil may be electrically in series with the second wound coil. Alternatively, in the first configuration, the first wound coil may be electrically disconnected from the second wound coil. The first wound coil and the second wound coil may be both formed of wire having the same gauge. Each of the first wound coil and the second wound coil may be formed of wire having a different gauge. The first wound coil and the second wound coil may be both formed of the same number of coil turns. Alternatively, the first wound coil and the second wound coil may each be formed of a different number of coil turns. The first wound coil and the second wound coil may have substantially the same or a different resistance. The coil assembly may be configured to be supplied with a constant voltage and with a first current of a first magnitude when the switching circuit switches the first and second wound coils into the first configuration and a second current of a second magnitude when the switching circuit switches the first and second wound coils into the second configuration, the second magnitude being greater than the first magnitude. The first and second wound coils may be adhesively attached to one another, for example.

DETAILED DESCRIPTION

Fast access times for reading and writing data are paramount for disk drives destined for the higher end enterprise market. However, from a cost-benefit analysis, it has become clear that significant decreases in access times may be achieved without resorting to the costly solution of uniformly driving the actuator assembly at a faster rate for all seek operations. Indeed, there are times during normal operation of the disk drive, in which even a marginally faster sweep of the read/write heads over the disk during a seek operation will result in a seemingly disproportional resultant decrease in access time. On the other hand, there are also occasions in which such a marginally faster sweep over the disk does not yield marketable differences in the drive's rated average access time.

For example, for some seek operations, it has become clear that, had the read/write heads arrived at the target track and target servo wedge just a little earlier in time, the read/write heads would not have missed the target wedge as it rotated past the read/write heads. Being even a little late in arriving at a target servo wedge, for the read/write heads, means having to wait for the spindle motor to rotate the disk almost a full revolution before the target servo wedge first passes under the read/write heads. The time period during which the disk rotates and brings a target wedge under the read/write heads is known as the spindle motor latency. Even at high rotational speeds, this latency (about 6 ms for 10,000 rpm spindle motors used in enterprise-class disk drives as of this writing) detrimentally affects the drive's performance on industry standard benchmarks.

Embodiments of the present invention, therefore, have focused on selectively increasing the maximum torque (which may be expressed as the product of the current through the coil, the number of turns of the coil and the flux density in the VCM airgap) that may be exerted on the actuator assembly. This selective increase in torque, according to embodiments of the present invention, may (for example) be operative for selected seek operations in which the spindle motor latency would significantly affect the time to complete the seek operation. Moreover, constraints on cost, space, thermal dissipation dictate that such selective increase on the torque exerted on the actuator assembly be achieved without necessitating an increase in the number of coils or coil turns, without changing the gauge of the VCM coil, without increasing the f volume of the VCM magnets and without increasing the voltage supplied to the VCM coil, although these constraints may be optionally changed in concert with embodiments of the present invention.

Figure 1:
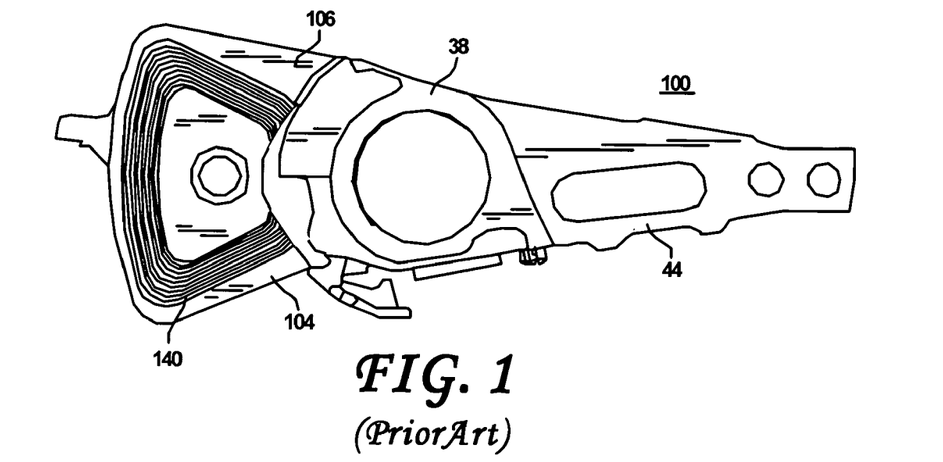
FIG. 1 is a plan view of a conventional disk drive actuator assembly.
Figure 2:
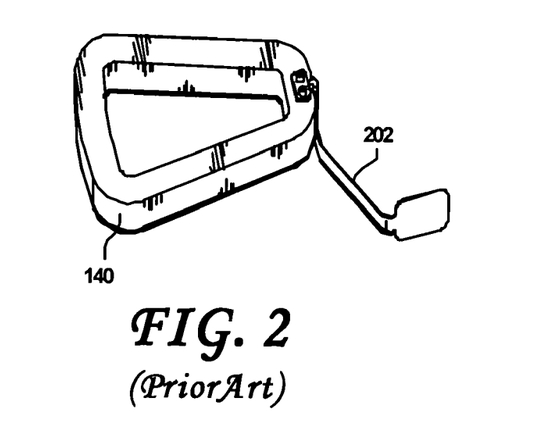
FIG. 2 is a detail view of a portion of FIG. 1, and shows a perspective view of a conventional coil of a VCM.
Figure 3:
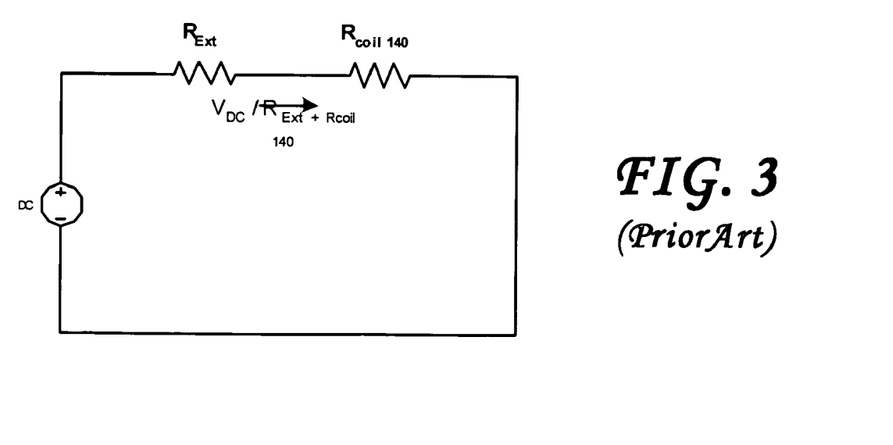
FIG. 3 is an electrical model of the coil voltage supply and the conventional coil of FIGS. 1 and 2.

FIG. 1 shows a conventional actuator assembly 100. The actuator assembly 100 includes a body portion 38, one or more actuator arms 44 cantilevered from the body portion 38 and a coil portion cantilevered from the body portion in an opposite direction from the actuator arms 44. The coil portion includes a first and a second actuator arm fork members 104, 106 and/or a plastic overmold that are configured to support a coil 140. A conventional coil 140 may include a single strand of wire that is wound into a suitable shape, such as shown in FIG. 2. In keeping with the constraints enumerated above, the magnitude of the coil driving current is limited by the winding resistance of the coil and the fixed voltage applied across the coil by the power supply, according to Ohm's law. For the purposes of the present analysis, the coil winding resistance may be said to include the external resistance of the coil, which external resistance includes, among others, the resistance of the flex cable assembly, the sense resistance, the FET resistance and the diode resistance. As shown in FIG. 3, the V-I characteristics of the coil may simply be modeled as a DC voltage supply connected across a series combination of the winding resistance $R_{coil}$ of the coil itself and the external resistance $R_{Ext}$. The coil input current, therefore, may be expressed as $V_{dc}/R_{Coil}+R_{Ext}$. Therefore, if the supply voltage is maintained constant, to increase the coil input current requires that the coil winding resistance be reduced. If the coil winding resistance is reduced, the coil input current increases, as the supply voltage is maintained constant. In turn, an increased coil input current leads to greater power dissipation in the coil, as the power dissipation varies as the product of the coil winding resistance and the square of the coil input current. This power is dissipated as heat. It is, therefore, necessary to limit the heat generated by the coil to within an acceptable range. This may be done, for example, either by limiting the increase in the coil input current and/or by limiting the amount of time during which the coil is subjected to the increased coil input current.

Figure 4:
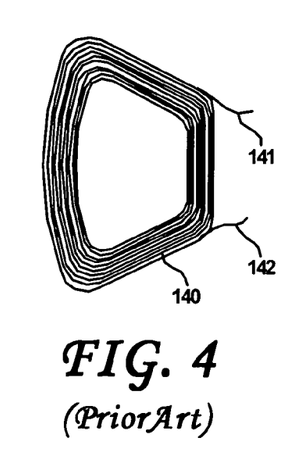
FIG. 4 is a plan view of a conventional coil, and shows the two coil leads thereof.
Figure 5A:
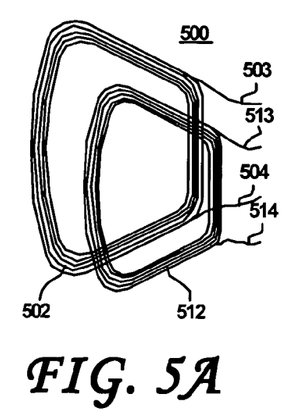
FIG. 5A is a conceptual representation of a coil assembly according to an embodiment of the present invention, and shows the first, second, third and fourth coil leads thereof.
Figure 5B:
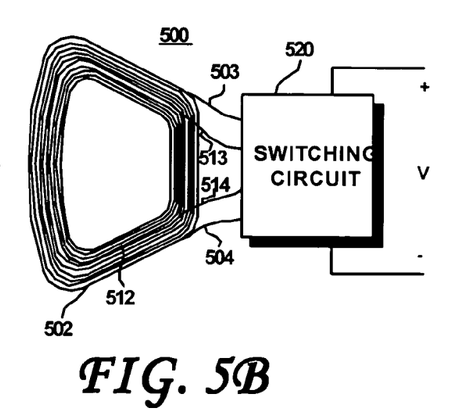
FIG. 5B shows the coil assembly electrically connected to the switching circuit and the voltage supply, according to an embodiment of the present invention.

FIG. 4 shows the conventional coil 140 of FIG. 1. Although shown as concentric loops of wire (solely for ease of illustration), it is understood that the coil 140 is a single coiled and adhesively bound strand of wire terminated by a first coil lead 141 and a second coil lead 142. The first and second coil leads 141 and 142 are electrically coupled to the VCM's voltage supply (not shown). FIGS. 5A and 5B are conceptual representations of a coil portion of a VCM of a disk drive according to an embodiment of the present invention. As best shown in FIG. 5A, the coil portion of a disk drive according to an embodiment of the present invention includes a coil assembly 500 that includes a first wound coil 502 and a second wound coil 512. Again, although the first wound coil 502 is shown in FIGS. 5A and 5B as concentric loops of wire (for ease of illustration only) it is understood that the first wound coil 502 is a single continuous strand of wire, terminated by a first coil lead 503 and a second coil lead 504. Similarly, although the second wound coil 512 is shown in FIGS. 5A and 5B as including concentric loops of wire (for ease of illustration only) it is also understood that the second wound coil 512 is a single continuous strand of wire separate from that of the first coil 502. The second coil 512 is terminated by a third coil lead 513 and a fourth coil lead 514. Conceptually, the first and second coils 502, 512 may be thought of as being formed by cutting a conventional coil such as shown in FIG. 4 in two, thereby creating separate two coil halves, each being terminated by two coil leads. The first and second coils 502, 512 may then be adhesively attached to one another, as shown in FIG. 5B (for example). The resultant coil assembly 500 may have substantially the same mass and thus inertia as the conventional coil 140 of FIG. 4, but includes first to fourth coil leads 503, 504, 513 and 514. The first and second coils 502, 512 may be formed in many different configurations. For example, the first and second coils 502, 512 may be formed of equal lengths of wire. Alternatively, the first and second coils 502, 512 may be formed of unequal lengths of wire. Similarly, the first and second coils 502, 512 may be formed of wire of the same gauge or different gauges. Also, the first and second coils 502, 512 may be formed of the same or a different number of coil turns. The first and second coils 502, 512 may be arranged in the same or a different geometry relative to one another and/or may have the same or a different geometry as conventional VCM coils such as shown at 140 in FIGS. 1 and 4. Other characteristics of one or both of the first and second coils 502, 512 may be varied at will, depending upon the desired resultant electrical and/or mechanical behavior of the coil assembly 500 within the drive's VCM. For example, the first and/or second coils 502, 512 may be formed of copper, aluminum and/or one or more other conductive materials.

However formed, configured and/or assembled, the coil assembly 500 includes first to fourth coil leads 503, 504, 513 and 514. As shown in FIG. 5B, these coil leads may be electrically coupled to a switching circuit 520. According to embodiments of the present invention, the switching circuit 520 may be electrically coupled to a voltage signal, to a first pair of coil leads that includes the first and second coil leads 503, 504 and to a second pair of coil leads that includes third and fourth coil leads 513, 514. According to an embodiment of the present invention, the switching circuit 520 may be configured to selectively switch the first and second wound coils 502, 512 between a first configuration and a second configuration, the second configuration being different than the first configuration. According to one embodiment, the second configuration is one in which the first wound coil 502 is electrically in parallel with the second wound coil 512. According to another embodiment, the first configuration is on in which the first wound coil 502 is electrically in series with the second wound coil 512. In this manner, the switching circuit 520 may be configured to switch the coil assembly 500 between a first configuration in which the first and second wound coils 502, 512 are electrically in series with one another and a second configuration in which the first and second coils wound 502, 512 are electrically in parallel with one another.

Figure 6:
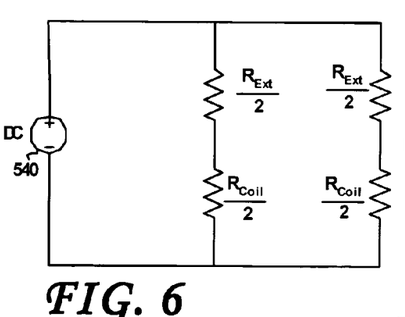
FIG. 6 is an electrical circuit that models the first and second coils of the coil assembly in a second (parallel) configuration, according to an embodiment of the present invention.
Figure 7:
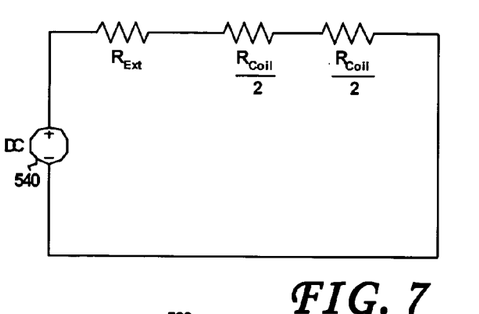
FIG. 7 is an electrical circuit that models the first and second coils of the coil assembly in a first (e.g., series) configuration, according to an embodiment of the present invention.

FIG. 6 shows an electrical model of the first and second wound coils 502, 512 in the second, parallel configuration. In the circuit diagram shown in FIG. 6, the external resistance in each branch of the parallel combination is assumed to be half of the total external resistance $R_{Ext}$. Assuming, for example, that the coil assembly 500 has a total resistance of $R_{Coil}$ and each of the first and second wound coils 502, 512 is configured such that each has a resistance of $R_{Coil}/2$, then the second configuration of the first and second wound coils 502, 512, from an electrical standpoint, may be modeled as shown in FIG. 6. Keeping the same assumptions, the first configuration of the first and second wound coils 502, 512 may be modeled as shown at FIG. 7. It can be seen that the equivalent coil resistance of the coil assembly 500 when the first and second wound coils 502, 512 are switched to the second configuration of FIG. 6 is $((R_{Coil\ 502}/2+R_{Ext}/2)^*(R_{Coil\ 512}/2+R_{Ext}/2))/((R_{Coil\ 502}/2+R_{Ext}/2)+(R_{Coil\ 512}/2+R_{Ext}/2))$ or $R_{Coil\ Assembly\ 500}/4+R_{Ext}/2$ when $R_{Coil\ 502}=R_{Coil\ 512}$, whereas the equivalent coil resistance of the coil assembly 500 when the first and second wound coils 502, 512 are switched to the first configuration of FIG. 7 is: $R_{Coil\ 502}+R_{Coil\ 512}+R_{Ext}$. It can therefore be seen that the equivalent resistance of the coil assembly 500 when the first and second wound coils 502, 512 are in the second configuration is identical or substantially identical to $R_{Coil\ 140}$, the resistance of the coil 140 of FIG. 1, as represented in FIG. 3. Therefore, assuming that the first and second wound coils 502, 512 have the same resistance, the equivalent resistance of the coil assembly 500 when the first and second wound coils 502, 512 are in the second (parallel) configuration is about one fourth of the equivalent resistance of the coil assembly 500 when the first and second wound coils 502, 512 are in the first (series) configuration. Therefore, a source of voltage V may source about four times as much current i to the coil assembly 500 when the first and second coils are in the second (parallel) configuration ($V_{DC}=I^*(R_{Coil}/4+R_{Ext}/2)$) as compared to when they are in the first (e.g., series) configuration ($V_{DC}=I^*(R_{Coil}+R_{Ext})$ or $I=V_{DC}/(R_{Coil}+R_{Ext})$).

Figure 8:
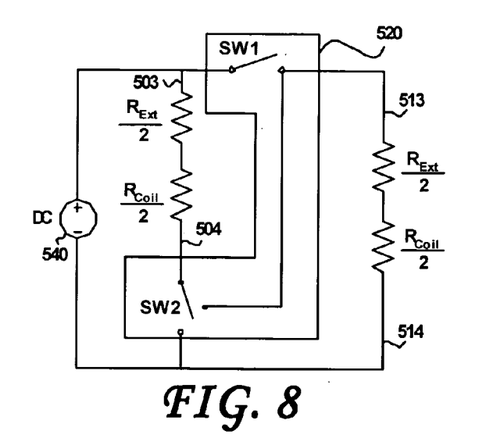
FIG. 8 is an electrical circuit that models the present coil assembly, the switching circuit and the voltage supply, according to an embodiment of the present invention.
Figure 9:
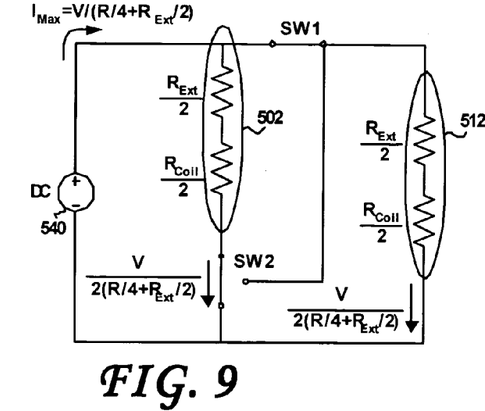
FIG. 9 shows the electrical circuit of FIG. 8, in which the switching circuit has switched the first and second coils to the second configuration.
Figure 10:
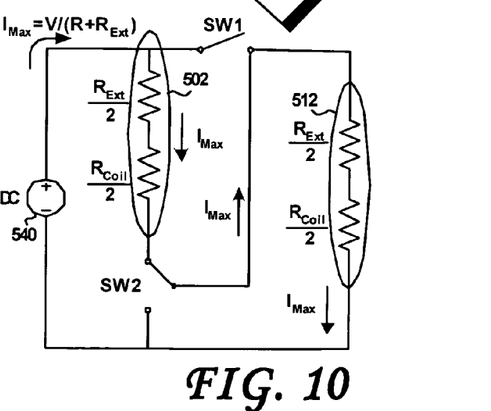
FIG. 10 shows the electrical circuit of FIG. 8, in which the switching circuit has switched the first and second coils to the first configuration.

FIG. 8 is a representation of an electrical model of the coil assembly 500 and a conceptual representation of the switching circuit 520 of FIG. 5, according to an embodiment of the present invention. The circuit shown in FIG. 8 is the same as that shown in FIG. 6, with the addition of an embodiment of the switching circuit 520. As shown, the switching circuit 520 is coupled to the voltage signal as well as to the first to fourth coil leads 503, 504, 513 and 514. Conceptually, the illustrated embodiment of the switching circuit 520 may be thought of as switches SW1 and SW2. SW1 and SW2 are shown in FIGS. 8–10 as being mechanical switches for clarity of illustration. It is to be understood, however, that the physical implementation of the switching circuit 520 may differ from that shown in the figures. Indeed, the switching functions may be implemented with relays, transistors, diodes or most any device or combination of devices capable of selectively creating open and closed circuits. As shown in FIG. 9, when SW1 is closed to create a closed circuit between coil leads 503 and 513 and SW2 is controlled to create a closed circuit between coil leads 504 and 514, the resulting circuit topology is electrically that of the second configuration shown in FIG. 6, with the first and second coils 502, 512 in arranged in parallel. However, when SW1 is open and SW2 controlled to create a short circuit between the second coil leads 504 and the third coil leads 513, the resultant circuit is one in which the first and second coils 502 and 512 are in the first (series) configuration, as shown in FIG. 7. Other implementations of the switching circuit 520 may occur to those of skill in this art, and all such implementations are deemed to fall within the scope of the inventions shown, described and claimed herein.

According to an embodiment of the present invention, when it is determined that the seek operation should proceed without the additional torque produced by configuring the first and second coils 502, 512 in the second configuration, the first and second coils remain in or are switched to the first configuration (e.g., the series configuration). In this manner, the first configuration may be considered to be the default configuration of the coil assembly 500—that is, the configuration used during the majority of the seek operations the drive is called upon to perform. However, when it is determined that significant gains would be achieved by boosting the velocity of the radial sweep of the actuator arm(s) over the recording surface(s) of the disk(s), the switching circuit 520 may be controlled to switch the first and second coils 502, 512 to the second configuration, in which a current of greater magnitude may be sourced to the coils 502, 512 for a limited period of time. It may also be determined, according to further embodiments of the present invention, that the coil assembly 500 is currently too hot, and that increasing the current therethrough would or may damage the coil assembly 500 and/or other drive components by increasing the temperature of the coil assembly beyond a pre-established threshold. The determination of the current temperature of the coil assembly 500 may be carried out by direct measurement using, for example, a temperature sensor on or near the coil assembly 500. Alternatively, the current temperature of the coil may be estimated mathematically and/or by reference to a look up table correlating the magnitude and duration of the applied current with the physical (e.g., power dissipation) characteristics of the coils 502, 512. Other means of measuring and/or estimating the temperature of the coil assembly 500 may be employed.

From the foregoing, it is clear that the increased current sourced from the supply 540 when the coil assembly 500 is in the second configuration should be used, according to embodiments of the present invention, only selectively, i.e., not all of the time. For example, the coil assembly 500 may be switched into the second configuration in which the VCM voltage supply sources the increased current only for selected seek operations in which the added velocity of the actuator arm incident to the increased torque exerted thereon would significantly decrease the access time to the target track and/or target servo wedge. The selective use of the second configuration is necessary, at least in part, due to the increased power dissipation that occurs when the increased current is sourced from the VCM voltage supply. In terms of power, the coil assembly 500, in the first configuration (e.g., series connection) must only dissipate P= $V^2/(R_{Coil}+R_{Ext})$ watts. In contrast, the coil assembly 500, in the second configuration (i.e., parallel connection) must dissipate P=$V^2/(R_{Coil}/4+R_{Ext}/2)$ watts. Therefore, when operated in the second configuration, over four times as much power must be dissipated by the coil as compared to the case wherein the coil is operated in the first (series) configuration.

A motor constant known as Km may be used as a figure of merit for the VCM, which constant is an indication of motor efficiency, with a high Km indicating a high motor efficiency and a low Km indicating a low motor efficiency. Km may be expressed as $Kt/\sqrt{R}$ or $Kt^2/R$, where R is the winding resistance in ohms of the coil assembly 500 and Kt is the VCM's torque constant (in units of Newton-meters/amp), which is a measure of the amount of torque developed by the VCM for a given current. The units of Km may be expressed as inch ounces per root watt, which describes the ability of the coil assembly 500 to produce torque as a function of heat. The heat dissipated (a function of the $I^2R$ losses in the windings of the coils 502, 512 of the coil assembly 500) increases as the square of the torque.

| | 1st Config. (Series) | 1st Config. (Series Ex. #1) | 2nd Config. (Parall 1) | 2nd Config. (Parallel Ex. #1) |
|---|---|---|---|---|
| Wire Gage | X | X | X | X |
| # of Coils | 1 | 1 | 2 | 2 |
| Coil Turn per coil | N | N | 0.5N | 0.5N |
| Total Coil Turns | N | N | N | N |
| Resistance per coil | R | 6.4 | R/2 | 3.2 |
| Coil(s) total Resistance | R | 6.4 | R/4 | 1.6 |
| Kt per coil | Kt | Kt | Kt/2 | Kt/2 |
| Total Kt | Kt | Kt | Kt | Kt |
| Km | Kt^2/R | Kt^2/R | Kt^2/R | Kt^2/R |
| External Resistance | $R_{Ext}$ | 2 | $R_{Ext}$ | 2 |
| Supply Voltage | V | 11.7 | V | 11.7 |
| Total Resistance | R + $R_{Ext}$ | 8.4 | R/4 + $R_{Ext}$/2 | 2.6 |
| $I_{Max}$ | V/(R + $R_{Ext}$) | 1.39 | V/(R/4 + $R_{Ext}$/2) | 4.5 |
| $I_{Max}$ per coil | V/(R + $R_{Ext}$) | 1.39 | V/(2(R/4 + $R_{Ext}$/2)) | 2.25 |
| Torque | Kt*V/(R + $R_{Ext}$) | 1.39 Kt | Kt*V/(2(R/4 + $R_{Ext}$/2)) | 2.25 Kt |
| Power | V^2/(R + $R_{Ext}$) | V^2/8.4 | V^2/(R/4 + $R_{Ext}$/2) | V^2/2.6 |

Table 1 above details the differences in the torque generated and the power dissipated by the coil assembly 500 with the first and second coils 502, 512 in the first and second configuration.

As shown, table 1 defines expressions for a number of physical and electrical characteristics of the coil assembly 500 in the first configuration in which the first and second coils 502, 512 are in their first (series) configuration and in the second configuration in which the first and second coils 502, 512 are in their second (parallel) configuration. For each of these configurations, an example is given to quantify the torque and power expressions for an exemplary disk drive. Turning now to the table entries, in each of the two configurations, the same wire gauge is used for each of the first and second coils, although this need not be the case. This wire gauge is simply denoted in Table 1 as X. In the "Number of Coils" row, it can be seen that, in the first configuration, the coil assembly 500 can be considered to be a single continuous coil, as the constituent first and second coils 502, 512 thereof are electrically connected in series. In contrast, the same row lists the number of coils in the second configuration as 2; namely, coils 502, 512 that are electrically connected in parallel. Continuing down the table, the number of turns per coil is assigned the variable N when the coil assembly 500 is in the first configuration and N/2 in the second configuration, although this need not be the case, as the number of turns for each of the first and second coils 502, 512 need not be equal. Note that aggregate number of turns does not change between the first and second configurations, as shown by the "Total Coil Turns" row. That is, no fewer or additional lengths of wire and/or turns thereof are taken away or added to the coil assembly 500, either when switched in the first or the second configuration. Table 1 assumes that the first and second coils have an equal number of turns of the same gauge coil wire. It is to be understood, however, that this is for exemplary purposes only and that each of these characteristics and/or combinations of such characteristics may be varied as desired or as required by the design constraints at hand. In the exemplary case illustrated by table 1, the resistance per coil is denoted by the variable R. As can be seen, the resistance per coil, for exemplary purposes, is shown at 6.4 Ω. In this exemplary embodiment, the coils 502, 512 are chosen to have equal resistance. If the total resistance of the coil assembly in the first configuration is 6.4 Ω, then the resistance of each of the first and second coils 502, 512 is 3.2 Ω, as shown in table 1. As demonstrated above, the total resistance of the coil assembly 500 in the first configuration is R and is R/4 in the second configuration. Keeping with the exemplary numbers above, the total resistance of the coil assembly 500 in the first configuration is 6.4 Ω and 1.6 Ω in the second configuration, as shown in table 1 above.

Although the total torque constant Kt of the VCM remains the same irrespective of whether the first and second coils 502, 512 are in the first or second configuration, the Kt per coil is half (Kt/2) when the first and second coils 502, 512 are in a parallel configuration as compared to when they are in a series configuration. The VCM's figure of merit Km remains unchanged across configurations, as Km when the first and second coils 502, 512 are in the second configuration is $(Kt/2)^2/(R/4)$ or $Kt^2/R$, the same value as when the coil assembly 500 is in the first configuration. The external resistance $R_{Ext}$, which includes the resistance of the coil's flex circuit(s) and external circuitry (including Sense, FET and the like) may also remain constant and unaffected by the configuration of the first and second coils 502, 512. For example, the value of $R_{Ext}$ may be about 2 Ω. In the exemplary case detailed in table 1, the supply voltage for the coil assembly 500 may be 11.7 volts, and may also be fixed and unaffected by the configuration of the coil assembly 500. As detailed above, the total resistance of the coil assembly 500 is R+$R_{Ext}$ and R/4+$R_{Ext}$/2 when the first and second coils 502, 512 are in the first and second configurations, respectively. Keeping with the exemplary resistance magnitudes discussed above, the R+$R_{Ext}$ expression evaluates to 8.4 Ω and the expression R/4+$R_{Ext}$/2 evaluates to 2.6 Ω. It can, therefore, be seen that the resistance of the coil assembly 500 is almost four times smaller in the second configuration as it is in the first configuration. In turn, this resistance differential between the first and second configurations enables the fixed voltage supply 540 to source an input current to the coil assembly 500 of greater magnitude when the coils 502, 512 are in the second configuration than is possible when they are in the first configuration.

As the supply voltage is fixed, the current able to be sourced by the voltage supply 540 is dependent upon the resistance of coil assembly 500. As shown in table 1, the maximum coil input current $I_{Max}$ may be quantified by dividing the magnitude of the voltage applied across the coil assembly 500 by the sum of the total coil resistance and the external resistance; that is, $I_{Max}$=V/(R+$R_{Ext}$) when the coil assembly 500 is in the first configuration and $I_{Max}$=V/(R/4+$R_{Ext}$/2) when the coil assembly 500 is in the second configuration. Using the above-detailed exemplary resistance magnitudes for the resistance of the coils 502, 512, the supply voltage sources a maximum input current to the coil assembly 500 of 1.39 Amps to the coil assembly 500 when it is in the first configuration and 4.5 Amps to the coil assembly 500 when it is in the second configuration. The maximum input current per coil 502, 512 is 1.39 Amps when the first and second coils 502, 512 are in series and 2.25 Amps when they are in the second configuration (assuming that the coils 502, 512 have the same electrical characteristics—e.g., gauge, turns, resistance, etc.).

The torque and the power to be dissipated by the actuator assembly are directly related to the current sourced to the coil assembly 500 by the voltage supply 540. Indeed, torque may be defined as the product of the VCM's torque constant Kt and the current $I_{Max}$ through the coils 502, 512 or the product of Kt and the voltage supplied by voltage supply 540 divided by the coil resistance. Using the above-developed values, the torque for the VCM when the coil assembly 500 is in the first configuration works out to 1.39 Kt and 2.25 Kt when the coil assembly 500 is in the second configuration, a nearly 62% increase in torque.

Although this increased torque (and thus increased actuator speed) is selectively available to the drive by causing the switching circuit 520 to configure the first and second coils 502, 512 in the second configuration, doing so comes at the cost of increased power, which manifests itself as increased heat in the coils 502, 512. This power dissipation varies as the square of the supply voltage from voltage supply 540 divided by the total resistance, which includes the external resistance $R_{Ext}$ and the total coil resistance, as shown in table 1. Continuing with the above example, the power dissipation requirements for the coil assembly 500 in the first configuration is $V^2/8.4$ (16.3 watts for a 11.7 V supply voltage) versus a higher $V^2/2.6$ (or 52.65 watts for the 11.7 V supply voltage) when the coil assembly 500 is in the second, parallel, configuration.

It is, therefore, clear that switching the coil assembly 500 to the second configuration greatly increases the power dissipation requirements of the VCM. The coil assembly 500, therefore, must be allowed to cool down if its temperature (either measured or calculated) approaches a predetermined threshold. This cooling, for example, may take place during track following operations (during which little torque is exerted on the actuator assembly by the VCM) or during subsequent seek operations carried out in with the first and second coils 502, 512 switched to or remaining in the first configuration. The determination of when and if to switch the coil assembly 500 to the second configuration may be carried out, for example, by the drive controller. The drive controller, for example, may compute the duration of the next seek operation, while taking the rotational latency of the spindle motor into consideration. This next seek operation may include both translational and radial motion as the slider's transducers are moved from above the current track and servo wedge to the destination track and servo wedge. In doing so, the controller may consult one or more tables in which these seek times may have been pre-computed and stored. When the controller determines that the next seek operation may benefit from switching the first and second coils 502, 512 to the second configuration and that the current coil temperature will be able to safely dissipate the added heat generated by the increased current flowing therethrough, the controller may control the switching circuit 520 (or otherwise cause the switching circuit 520) to switch the first and second coils 502, 512 to or remain in the second configuration. This determination may advantageously include a consideration of the future position of the target wedge at the time the slider's transducers are scheduled to arrive, which is a function of the spindle motor latency discussed above. In practice, the controller may cause the coil assembly 500 to be switched to the second configuration for only fewer than 20% of the seek operations it is called upon to perform. For example, the coil assembly 500 may be switched to or remain in the second configuration fewer than 10% of the time such as, for example, from about 1% to about 5% of the total number of seek operations, the remainder of the seek operations being carried out with the coil assembly 500 in the first configuration, in which the coil assembly 500 is able to safely dissipate the heat generated over multiple consecutive seek operations. Various means and methods for optimizing the application of the increased current to the coil assembly 500 may occur to those of skill in this art and all such means and methods are deemed to fall within the scope of the present inventions.

Figure 11:
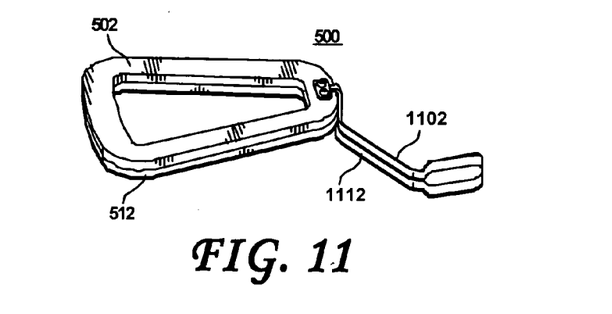
FIG. 11 is a representation of a coil assembly including first and second coils, according to another embodiment of the present invention.
Figure 12:
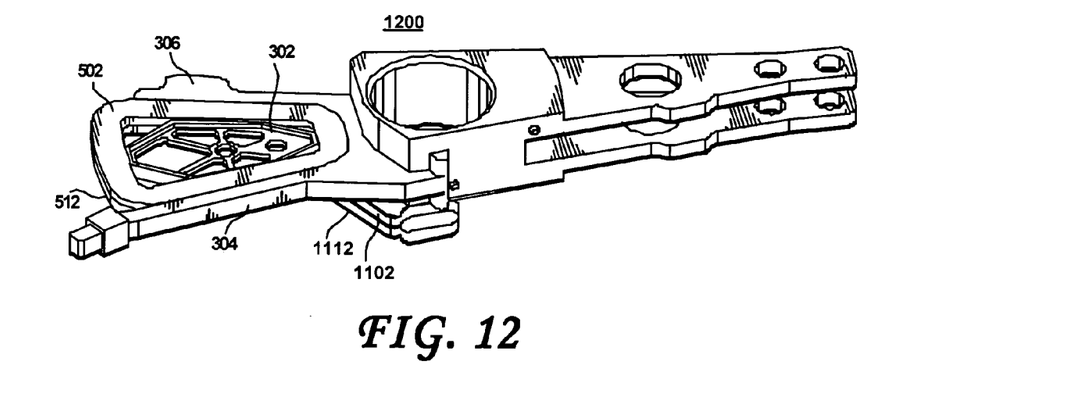
FIG. 12 is a representation of an actuator assembly including the coil assembly of FIG. 11, according to an embodiment of the present invention.
Figure 13:
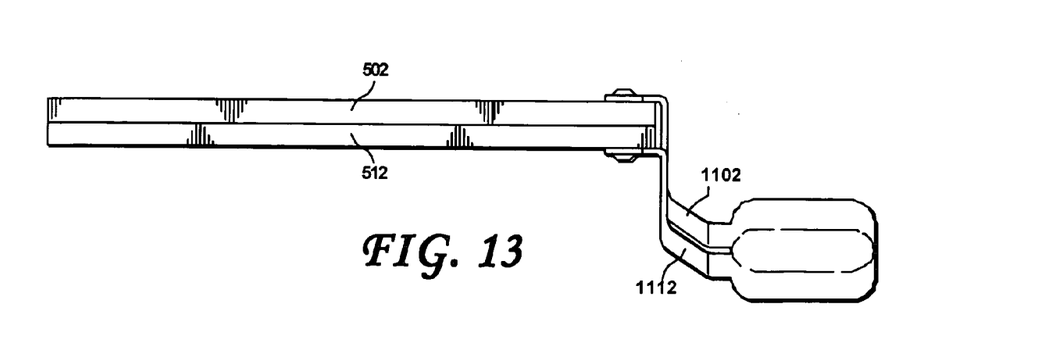
FIG. 13 is a side view of the coil assembly of FIG. 11.

FIGS. 11 and 13 shows a coil assembly 500, according to an embodiment of the present invention. FIG. 12 shows an actuator assembly 1200 according to an embodiment of the present invention. As shown, the coil assembly may include a first coil 502 and a second coil 512, arranged (for example) in the stacked configuration shown in FIG. 13. The first and second coils 502, 512 may have the same dimensions and geometry as one another, as shown. Adhesive may be used to attach the first and second coils 502, 512 together. The resultant coil assembly 500 may have the same or almost the same dimensions as a coil having a number of turns equal to the sum of the turns in the first and second coils 502, 512. That is, the coil assembly 500 including first and second coils 502, 512 may have a footprint no larger or only slightly larger than a conventional coil of the same mass and inertia, such as shown at 140 in FIG. 1. The coil assembly 500 may be supported by and adhesively attached to the actuator assembly of FIG. 12 by first and second actuator fork members 304, 306, as shown in FIG. 12. A bobbin 302 may be used to further stiffen the actuator assembly 1200. Extending from the first and second coils 502, 512 are first and second flex circuits 1102, 1112, respectively. The flex circuit 1102 may include the first and second coil leads 503, 504 and the flex circuit 1112 may include the third and fourth coil leads 513, 514 as traces on a polyimid substrate, for example. The coil leads 503, 504, 513, 514 may be electrically connected to the voltage supply 540, to supply the coil assembly 500 with the coil driving current necessary to generate torque.

Figure 14:
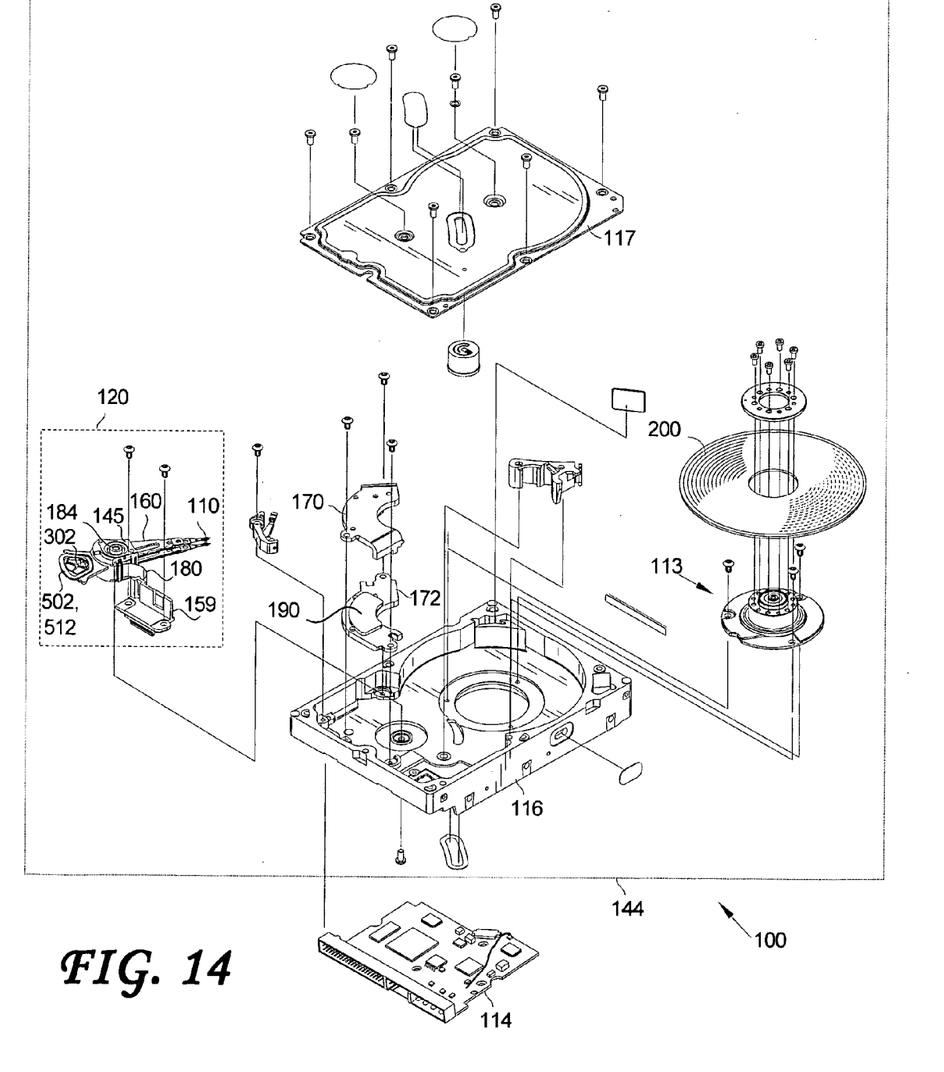
FIG. 14 is an exploded view of a magnetic disk drive according to an embodiment of the present invention.

FIG. 14 shows the principal components of a magnetic disk drive 100 according to an embodiment of the present invention. With reference to FIG. 14, the disk drive 100 comprises a head disk assembly (HDA) 144 and a printed circuit board assembly (PCBA) 114. The HDA 144 includes a base 116 and a cover 117 attached to the base 116 that collectively house a disk 200, a spindle motor 113 attached to the base 116 for rotating the disk stack 123, a head stack assembly (HSA) 120, and a pivot bearing cartridge 184 that rotatably supports the HSA 120 on the base 116. The spindle motor 113 rotates the disk 200 at a constant angular velocity. The HSA 120 comprises a swing-type or rotary actuator assembly 1200 (see FIG. 12), at least one head gimbal assembly (HGA) 110, a flex circuit cable assembly 180 and a flex bracket 159. The rotary actuator assembly 130 includes a body portion 145, at least one actuator arm 160 cantilevered from the body portion 145, and a coil assembly including first and second coils 502, 512 cantilevered from the body portion 145 in an opposite direction from the actuator arm 160. A bobbin 302 may be attached to the inner periphery of the coil assembly to stiffen the coil assembly. The actuator arm(s) 160 support the HGA(s) 110 that, in turn, support read/write transducer(s) (not shown) for reading and writing to the disk 200. The HSA 120 is pivotally secured to the base 116 via the pivot-bearing cartridge 184 so that the read/write transducer(s) at the distal end of the HGA 110 may be moved over the recording surface(s) of the disk(s) 200. The pivot-bearing cartridge 184 enables the HSA 120 to pivot about its pivot axis. The "rotary" or "swing-type" actuator assembly rotates on the pivot bearing 184 cartridge between limited positions, and the coil assembly that extends from one side of the body portion 145 interacts with one or more permanent magnets 192 mounted to back irons 170, 172 to form a voice coil motor (VCM). When a driving voltage is applied to the VCM, torque is developed that causes the HSA 120 to pivot about the actuator pivot axis and causes the read/write transducer(s) to sweep radially over the disk 200.

Many variations to actuator assemblies and disk drives disclosed herein are possible. For example, instead of the coil assembly 500 including first and second coils 502, 512 that are selectively switched in a series or parallel configuration, only the first coil 502 may be active most of the time, the second coil 512 being electrically disconnected or otherwise decoupled from the first coil 502 and/or the coil assembly 500. Then, when the controller determines that a boosted torque would avoid a spindle motor latency penalty and that the coil assembly would not overheat, the second coil 512 may be rendered active by coupling it in parallel (or in series) with the first coil 502 for a limited period of time. This decreases the overall resistance of the coil assembly and allows an increased current to be sourced to the coil assembly 500, which generates increased torque and allows the actuator assembly to move faster of the recording surface of the disk to the destination track. However, including a second coil 512 that is active only when additional torque is desired comes at the price of increased inertia; i.e., mass within the coil assembly 500 that does not contribute to the generation of torque under circumstances in which the increased torque is not needed. In this case, therefore, the second coil 512 may be configured with fewer turns than the first coil 502.

According to other embodiments of the present invention, the coil assembly 500 may include first and second coils 502, 512 that are each formed of higher gauge (thinner) wire that is wound a greater number of turns than conventional coils. Each of the first and second coils 502, 512 may have the same resistance as a single coil. However, the parallel combination of two such coils 502, 512 will have an overall lower resistance than either of the constituent coils 502, 512. This means that increased current may be input to the parallel combination for higher torque production. Alternatively, increasing the wire gauge enables the coil assembly 500 to include more coil turns than conventional coils, but with the same or substantially the same inertia.

Disclosed herein are actuators with two (or more) parallel coils. The actuator coil geometry (shape as well as volume) and Km may be the same as conventional actuator. Advantageously, due to the reduction in overall electrical resistance (resistance of coil plus the external resistance), higher current may be applied to the coil for higher torque generation and lower actuator move time (higher actuator velocity) than would be possible using conventional coils. Due to the presence of the coil external resistance, the present embodiments including selectively parallel and series-connected coils are more advantageous than a very low resistance series coil (conventional coil with low resistance).

What is claimed is:

1. A disk drive, comprising:
   a disk;
   a single supply of voltage;
   a head stack assembly for reading and writing to the disk, including:
      a body portion;
      an actuator arm cantilevered from the body portion;
      a coil portion cantilevered from the body portion in an opposite direction from the actuator arm, the coil portion including a coil assembly having a first wound coil and a second wound coil, the first coil defining a first pair of coil leads and the second wound coil defining a second pair of coil leads, and
   a switching circuit electrically coupled to the single supply of voltage and to the first and second pairs of coil leads, the switching circuit being configured to selectively switch the first and second wound coils between a first configuration and a second configuration in which the first wound coil is electrically in parallel with the second wound coil, the second configuration being different from the first configuration.

2. The disk drive of claim 1, wherein in the first configuration, the first wound coil is electrically in series with the second wound coil.

3. The disk drive of claim 1, wherein in the first configuration, the first wound coil is electrically disconnected from the second wound coil.

4. The disk drive of claim 1, wherein the first wound coil and the second wound coil are both formed of wire having a same gauge.

5. The disk drive of claim 1, wherein the first wound coil and the second wound coil are each formed of wire having a different gauge.

6. The disk drive of claim 1, wherein the first wound coil and the second wound coil are both formed of a same number of coil turns.

7. The disk drive of claim 1, wherein the first wound coil and the second wound coil are each formed of a different number of coil turns.

8. The disk drive of claim 1, wherein the first wound coil and the second wound coil have substantially a same resistance.

9. The disk drive of claim 1, wherein each of the first wound coil and the second wound coil has a different resistance.

10. The disk drive of claim 1, wherein the coil assembly is configured to be supplied with a constant voltage and with a first current of a first magnitude when the switching circuit switches the first and second wound coils into the first configuration and a second current of a second magnitude when the switching circuit switches the first and second wound coils into the second configuration, the second magnitude being greater than the first magnitude.

11. The disk drive of claim 10, wherein the switching circuit is configured to switch the first and second wound coils into the second configuration only during selected seek operations.

12. The disk drive of claim 10, wherein the switching circuit is configured to switch the first and second wound coils into the second configuration for a time period that is controlled such that a temperature of the coil assembly does not exceed a predetermined threshold.

13. The disk drive of claim 1, wherein the first and second wound coils are adhesively attached to one another.

14. The disk drive of claim 1, wherein the first pair of coil leads includes a first coil lead and a second coil lead, the second pair of coil leads includes a third coil lead and a fourth coil lead, and the disk drive further comprises a first flex circuit including a first flex circuit lead, a second flex circuit lead, a third flex circuit lead and a fourth flex circuit lead, and wherein the switching circuit selectively connects the first coil lead to the first flex circuit lead, selectively connects the second coil lead to the second flex circuit lead, selectively connects the third coil lead to the third flex circuit lead and selectively connects the fourth coil lead to the fourth flex circuit lead.

15. The disk drive of claim 1, wherein the switching circuit is configured to cause the coil assembly to exert a first maximum torque on the head stack assembly when the first and second wound coils are switched to the first configuration and wherein the switching circuit is configured to cause the coil assembly to exert a second maximum torque on the head stack assembly when the coil assembly is in the second configuration, the second maximum torque being greater than the first maximum torque.

16. A head stack assembly for a disk drive, comprising:
a body portion;
an actuator arm cantilevered from the body portion;
a coil portion cantilevered from the body portion in an opposite direction from the actuator arm, the coil portion including a coil assembly having a first wound coil and a second wound coil, the first coil defining a first pair of coil leads and the second wound coil defining a second pair of coil leads, and
a switching circuit that is configured to be electrically coupled to a single supply of voltage and to the first and second pairs of coil leads, the switching circuit being configured to selectively switch the first and second wound coils between a first configuration and a second configuration in which the first wound coil is electrically in parallel with the second wound coil, the second configuration being different from the first configuration.

17. The head stack assembly of claim 16, wherein in the first configuration, the first wound coil is electrically in series with the second wound coil.

18. The head stack assembly of claim 16, wherein in the first configuration, the first wound coil is electrically disconnected from the second wound coil.

19. The head stack assembly of claim 16, wherein the first wound coil and the second wound coil are both formed of wire having a same gauge.

20. The head stack assembly of claim 16, wherein each of the first wound coil and the second wound coil is formed of wire having a different gauge.

21. The head stack assembly of claim 16, wherein the first wound coil and the second wound coil are both formed of a same number of coil turns.

22. The head stack assembly of claim 16, wherein each of the first wound coil and the second wound coil is formed of a different number of coil turns.

23. The head stack assembly of claim 16, wherein the first wound coil and the second wound coil have substantially a same resistance.

24. The head stack assembly of claim 16, wherein each of the first wound coil and the second wound coil has a different resistance.

25. The head stack assembly of claim 16, wherein the coil assembly is configured to be supplied with a constant voltage and with a first current of a first magnitude when the switching circuit switches the first and second wound coils into the first configuration and a second current of a second magnitude when the switching circuit switches the first and second wound coils into the second configuration, the second magnitude being greater than the first magnitude.

26. The head stack assembly of claim 16, wherein the first and second wound coils are adhesively attached to one another.

* * * * *